(12) United States Patent
Kuramochi et al.

(10) Patent No.: US 6,876,915 B2
(45) Date of Patent: Apr. 5, 2005

(54) HEADWAY CONTROL SYSTEM

(75) Inventors: Yuichi Kuramochi, Hitachinaka (JP);
Toshio Manaka, Hitachinaka (JP);
Hidefumi Adachi, Mito (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/254,523

(22) Filed: Sep. 26, 2002

(65) Prior Publication Data

US 2003/0171857 A1 Sep. 11, 2003

(30) Foreign Application Priority Data

Mar. 11, 2002 (JP) .................................... 2002-064852

(51) Int. Cl.⁷ ............................................. G06F 19/00
(52) U.S. Cl. ...................... 701/96; 701/301; 701/79; 701/54
(58) Field of Search .................... 701/23, 70, 117–119, 701/1, 54, 64, 68, 78, 79, 301, 96, 95, 93

(56) References Cited

U.S. PATENT DOCUMENTS

| | | | |
|---|---|---|---|
| 6,076,622 A | * 6/2000 | Chakraborty et al. | 180/169 |
| 6,360,158 B1 | * 3/2002 | Hanawa et al. | 701/93 |
| 6,370,470 B1 | * 4/2002 | Yamamura et al. | 701/96 |
| 6,560,525 B1 | * 5/2003 | Joyce et al. | 701/96 |
| 2002/0069010 A1 | * 6/2002 | Nishira et al. | 701/96 |
| 2002/0095254 A1 | * 7/2002 | Egawa et al. | 701/96 |

FOREIGN PATENT DOCUMENTS

| | | |
|---|---|---|
| DE | 10017279 | 10/2001 |
| EP | 1065090 | 1/2001 |
| EP | 1233391 | 8/2002 |
| EP | 1070624 | 3/2003 |
| JP | 368126 | 3/1991 |

* cited by examiner

*Primary Examiner*—Thomas G. Black
*Assistant Examiner*—Ronnie Mancho
(74) *Attorney, Agent, or Firm*—Crowell & Moring LLP

(57) ABSTRACT

To provide a headway control system, in which a congestion following processing can be started by the same operation as in ordinary driving. An arrangement is provided that lets a following control unit 10 to start a control to follow a preceding vehicle on condition that a characteristic value, which is produced in a host vehicle when a driver starts moving the host vehicle, is detected in congested traffic. Acceleration or a vehicle speed may be used as the characteristic value. Another possible arrangement is to start the following control on condition that a variation in an engine of the host vehicle, which is generated in the host vehicle when the driver operates to start moving the host vehicle, is detected in congested traffic. For example, the following control may be started under condition that at least either one of the following is detected: an increase in an engine speed, an increase in an intake pressure, an increase in an injection pulse width, an increase in an engine oil pressure, and an increase in the number of ignition pulses.

19 Claims, 17 Drawing Sheets

HEADWAY CONTROL SYSTEM

BACKGROUND OF THE INVENTION

The present invention relates to a headway control system and, more particularly, to a headway control system provided with a traffic congestion following processing function.

A traffic congestion following device that allows a host vehicle to follow a preceding vehicle in heavy traffic is known. A common traffic congestion following device is provided with a function that detects a headway distance and a function that controls the host vehicle so as to move it forward or bring it to a stop. It performs a following processing to adjust the headway distance to an appropriate value. Two types of following processing are known. One is a fully automatic system, in which the host vehicle starts moving automatically as soon as the preceding vehicle moves forward. The other is a semi-automatic system that does not immediately perform the following processing even when the preceding vehicle moves forward, requiring intervention by a driver through switch operation as a trigger.

Japanese Utility Model Laid-open No. 3-68126 discloses a manually operated switch that is operated by the driver to perform the following processing in the semiautomatic system. Japanese Patent Laid-open No. 2000-118261 discloses an approach, in which an accelerator pedal is used as the switch to facilitate operation of the driver.

The manually operated switch, however, means that it necessary to provide a new switch. Moreover, it requires that the driver perform an operation in addition to driving the vehicle, which bothers the driver.

With the prior art, in which the accelerator pedal is used as the switch, it is difficult to set how much the accelerator pedal is to be depressed to determine that the switch is actuated. That is, it is difficult to establish a relationship between an accelerator pedal stroke and ON/OFF position of the switch.

In ordinary operations of vehicles, the accelerator pedal is used as a means of increasing the vehicle speed. The more the driver depresses the accelerator pedal, the higher the engine speed and thus the vehicle speed. Using the accelerator pedal as the switch gives the pedal a new function that is different from driving. Suppose that there is a preceding vehicle running immediately in front of the host vehicle in heavy traffic. Even while the following processing device is being activated, the driver is likely to feel hesitant about depressing the accelerator pedal hard when he or she is afraid that doing that could jump the host vehicle forward. It is thus difficult to set a large pedal stroke to cause the device to determine that the switch is turned ON. Another point to note about the following processing device is that the accelerator pedal is moved to move the vehicle forward as controlled through the device. This presents a new problem to the configuration using the accelerator pedal as the operation switch. That is, especially when the accelerator pedal is mechanically connected to a throttle valve, it is necessary to set a pedal stroke that causes the device to determine that the switch is turned ON larger than the pedal stroke that occurs under the control of the following processing device. It is necessary that the pedal stroke causing the device to determine that the switch is turned ON be set adequately large. To dissuade the driver (user) from being hesitant about depressing the accelerator pedal in such cases, it would be necessary to offer a new means or the like that would let the driver (user) know that the traffic congestion following device is being activated and that the host vehicle will not jump forward even when the accelerator pedal is depressed.

SUMMARY OF THE INVENTION

It is an object of the present invention to provide a headway control system that is capable of starting a traffic congestion processing using the same operation as an ordinary driving operation.

To achieve the foregoing object, an arrangement according to the present invention starts a preceding vehicle following control on condition that a characteristic value that is produced in the host vehicle when the driver starts the host vehicle in heavy traffic is detected. An acceleration or a vehicle speed may be used as the characteristic value.

Another possible arrangement is to start the following control on condition that a variation, which is generated in the engine of the host vehicle when the driver operates to start the host vehicle in heavy traffic, is detected. For example, the following control may be started under condition that at least either one of the following is detected: an increase in the engine speed, an increase in an intake pressure, an increase in an injection pulse width, an increase in an engine oil pressure, and an increase in the number of ignition pulses.

Still another possible arrangement is to start the following control on condition that the following are detected: namely, the host vehicle remains stationary, the preceding vehicle starts moving, and a transmission shift lever is in a drive range. In this case, it is possible not to start the following control if the driver is operating the brake.

A further possible arrangement is to start the following control on condition that the following are detected: namely, the host vehicle remains stationary, the preceding vehicle starts moving, the transmission shift lever is in the drive range, and the driver releases a brake pedal.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Preferred embodiments of the headway control system according to the present invention will be described with reference to the accompanying drawings.

First Embodiment

Figure 1:
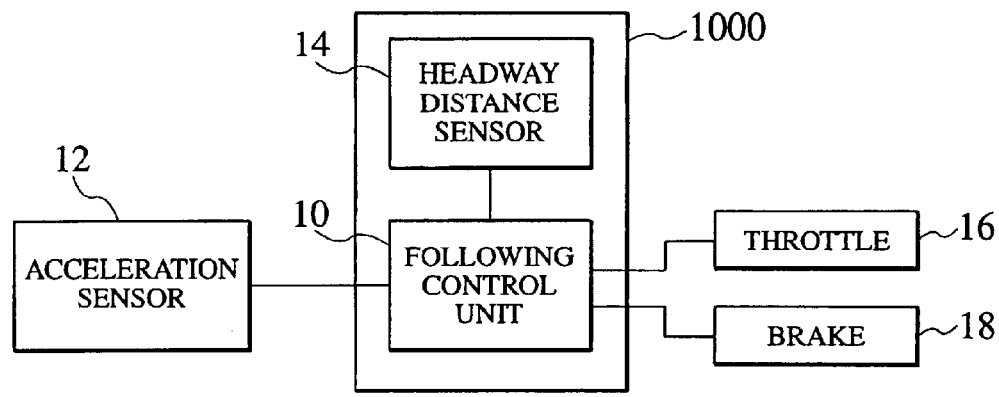
FIG. 1 is a block diagram showing a schematic configuration of a headway control system 1000 according to a first embodiment of the present invention.

A headway control system 1000 provided with a traffic congestion following function according to a first embodiment of the present invention will be explained with reference to FIGS. 1 through 3. As shown in FIG. 1, the headway control system 1000 is provided with a following control unit 10 and a headway distance sensor 14. The following control unit 10 selects either a congestion stop mode or a congestion following mode, and performs a following processing when the congestion following mode is selected. The headway distance sensor 14 detects a headway distance from a preceding vehicle and a relative speed and outputs detected data to the following control unit 10. An acceleration sensor 12 provided in a vehicle is connected to the following control unit 10. The following control unit 10 is, on the other hand, connected to a throttle module 16 that adjusts an engine intake air amount and a brake module 18 that generates a braking force.

The acceleration sensor 12 detects acceleration generated as a result of the vehicle's being started by a driver. On receiving an output signal from the acceleration sensor 12, the traffic congestion following device 1000 sets the congestion following mode, performing a processing to let the vehicle follow the preceding vehicle. The following processing performed by the following control unit 10 is a sequence of operations executed to adjust the headway distance to the preceding vehicle by controlling the throttle module 16 and the brake module 18 based on the headway distance and the relative speed detected by the headway distance sensor 14. Namely, a congestion following processing is initiated with the output signal from the acceleration sensor 12 used as a trigger condition while the vehicle is in heavy traffic.

Figure 2:
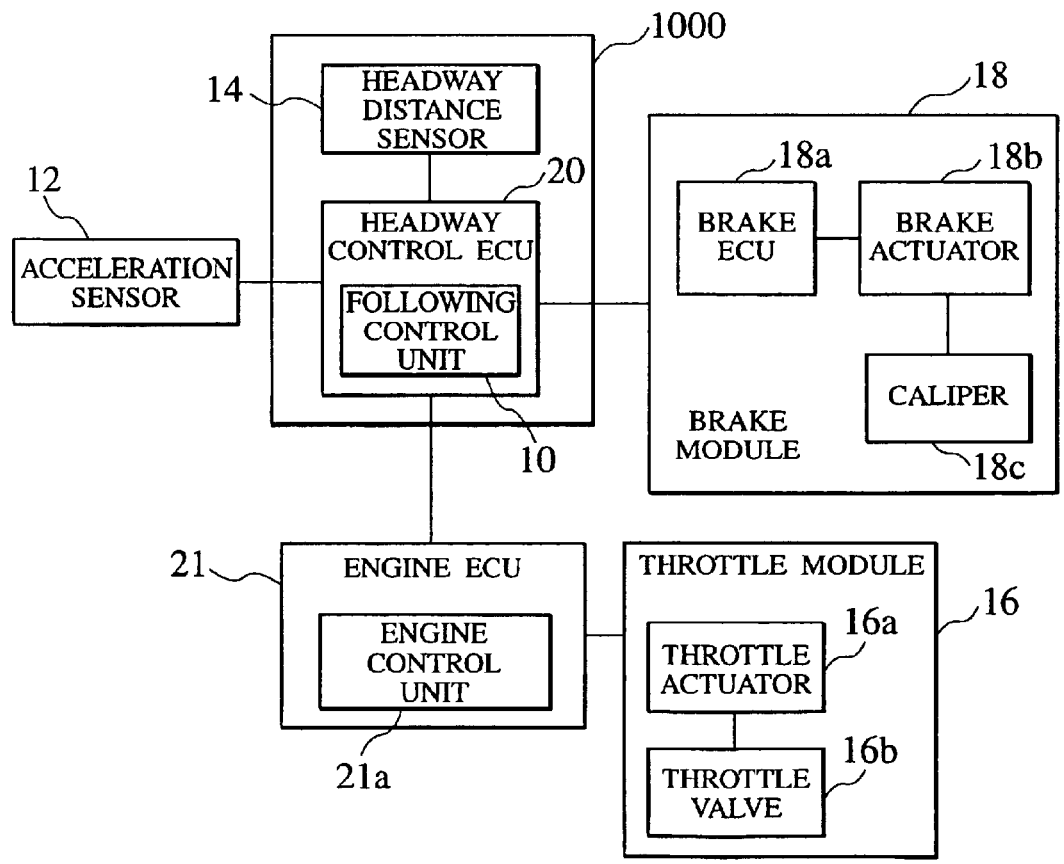
FIG. 2 is a block diagram showing a configuration of the headway control system 1000 according to the first embodiment of the present invention mounted in a vehicle.

FIG. 2 shows a specific configuration of the headway control system 1000 mounted in a vehicle. The headway control system 1000 is provided with a headway control ECU (Electronic Control Unit) that performs the headway control processing. The following control unit 10 forms part of the headway control ECU. The headway control ECU 20 is connected to an acceleration sensor 12, an engine ECU 21, and a brake module 18. Further, the engine ECU 21 is connected to a throttle module 16 and controls the same.

The headway control ECU 20 issues a deceleration command to the engine ECU 21 when the headway distance sensor 14 detects deceleration of the preceding vehicle in a running condition of following the preceding vehicle. On receipt of the deceleration command issued by the headway control ECU 20, an engine control unit 21a of the engine ECU 21 outputs a throttle closing signal to the throttle module 16. A throttle actuator 16a of the throttle module 16 closes a throttle valve 16b, as soon as it receives the throttle closing signal. When the headway distance sensor 14 detects that the preceding vehicle decelerates and stops, the headway control ECU 20 outputs a brake fluid pressure signal to the brake module 18. In response to the fluid pressure command from the headway control ECU 20, a brake ECU 18a of the brake module 18 causes a brake actuator 18b to generate the commanded fluid pressure, thereby actuating a caliper 18c to bring the vehicle to a stop through braking. It is at this time determined that the vehicle gets stuck in a jam and the following control unit 10 of the headway control ECU 20 sets the congestion stop mode.

When the preceding vehicle soon starts moving and the driver operates an operating portion to get the host vehicle started, as by depressing an accelerator pedal in an ordinary driving operation, the acceleration sensor 25 detects acceleration. Receiving the output from the acceleration sensor 25, the headway control ECU determines whether the system is currently in the congestion stop mode or not. If the system is in the congestion stop mode and, at the same time, has received an output signal from the acceleration sensor 12, the following control unit 10 selects the congestion following mode as switched from the congestion stop mode. In addition, it outputs a brake fluid pressure cancellation signal to the brake module 18 and a throttle opening signal to the throttle module 16 to start a headway control.

An arrangement is possible, in which the headway control ECU 20 is provided with a CPU, ROM, and RAM, and the CPU executes a program previously stored in the ROM to perform the automatic headway control operation during running and congestion described above. Control operations of the following control unit 10 according to this arrangement are realized by letting the CPU execute a congestion following control program that forms part of the program mentioned above. A control flow of the following control unit 10 will be explained with reference to FIG. 3.

The following control unit 10 first determines whether the vehicle is being controlled through an Adaptive Cruise Control, or ACC, operation performed by the headway control ECU 20. This decision is concerned with a check made on an operating condition of the ACC, whether or not an ACC operation flag is ON without regard to a running condition (accelerating, decelerating, or cruising) (step 31). If it is determined in step 31 that the ACC operation flag is ON, the control proceeds to step 32, in which it is determined whether the vehicle speed is 0 or not. If it is determined that the ACC operation flag is OFF, the control is directly terminated. If it is determined in step 32 that the vehicle speed is 0, it can be determined that vehicles ahead are stationary because of traffic congestion and the host vehicle follows a motion of the preceding vehicle to stop. Then in step 33, a congestion following flag is turned ON.

The preceding vehicle then starts moving, and the driver attempts to follow it and starts the host vehicle by operating the accelerator pedal or the like. When acceleration from standstill of a predetermined value or more is then produced, the acceleration sensor 12 detects this acceleration. On receipt of an acceleration-from-standstill signal from the acceleration sensor 12 in step 36, the following control unit 10 performs steps 34 and 37, measuring the headway from the preceding vehicle and controlling the host vehicle speed so as to follow the preceding vehicle. The following control unit 10 first detects a headway distance L in step 34. It then refers to a table that shows a predetermined relationship between a specific headway distance L and a corresponding speed and finds a speed corresponding to the detected headway distance L. It then controls the brake module 18 and the throttle module 16 so as to achieve the speed found in the table. This allows the host vehicle to move at a vehicle speed corresponding to the headway distance L. When the headway distance L from the preceding vehicle gradually shortens to become smaller than a predetermined set minimum headway distance $L_{min}$, the vehicle speed becomes 0. Then, the congestion following flag is turned OFF and the control processing is terminated (steps 38 and 39). The control then returns to step 31. If the ACC operation flag remains ON, the congestion following flag is turned ON through steps 32 and 33. If any acceleration from standstill occurs as a result of driver operations, the speed control is provided (steps 34 and 37). If, on the other hand, it is found in step 38 that the headway distance L becomes greater than a set maximum headway distance $L_{max}$ through the speed control provided in step 37, it can be determined that the traffic congestion has been unsnarled. In this case, too, the congestion following flag is turned OFF in step 39. Then, the control returns to step 31. If the ACC operation flag is ON and if it is known in step 32 that the vehicle speed becomes 0, it can be determined that the host vehicle is again brought to a stop in traffic. The congestion following flag is turned ON in step 33.

The congestion following flag may be ON in step 35 even if the vehicle speed is not 0 as found in step 32. If that is the case, it can be considered that the host vehicle has started moving from a congestion stationary state. Then, the control proceeds to step 36 and, if the acceleration sensor 12 outputs an acceleration signal, then a speed control and a brake control are performed.

As explained in the foregoing paragraphs, the headway control system 1000 according to the first embodiment of the present invention uses, as the trigger to start the congestion following processing, the acceleration from standstill, or a characteristic value produced in the vehicle when the vehicle is operated for starting. The operation used for starting the vehicle, including the operation on the accelerator pedal, is therefore the same as that used in ordinary driving. The driver has only to perform the same operation to start the host vehicle as in ordinary driving, when the preceding vehicle starts moving in traffic. The effect of the accelerator pedal as operated at this time is to open the throttle as in ordinary driving. It is not the effect of a switch to start the following processing. The relationship between the pedal stroke and vehicle movement is therefore the exactly the same as that in ordinary driving. The driver has therefore only to depress the accelerator pedal so lightly as to obtain a predetermined acceleration from standstill if the headway distance from the preceding vehicle is small. He or she does not need to depress the accelerator pedal so hard as to actuate a trigger switch, as predefined for the accelerator pedal being used as the trigger switch. This means that the congestion following processing is started through an operation quite natural to the driver's intention to follow the preceding vehicle in traffic. Moreover, there is no need of providing a separate operation switch for issuing a command to start the following processing.

Second Embodiment

Figure 4:
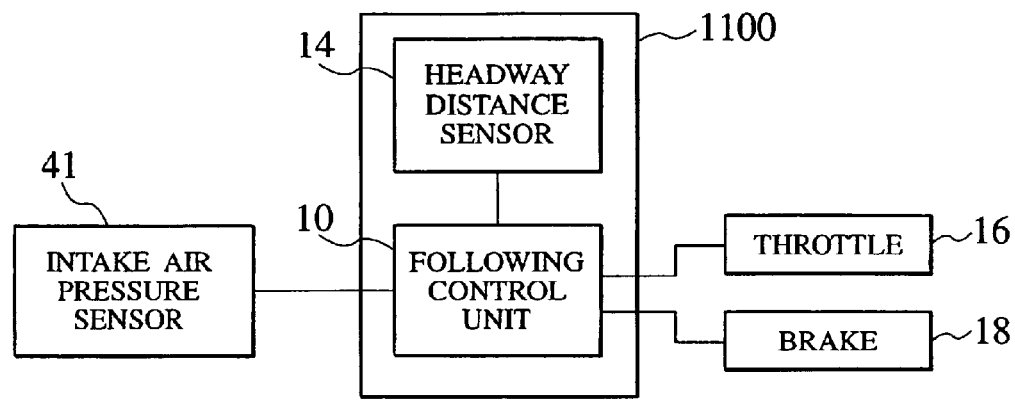
FIG. 4 is a block diagram showing a schematic configuration of a headway control system 1100 according to a second embodiment of the present invention.
Figure 5:
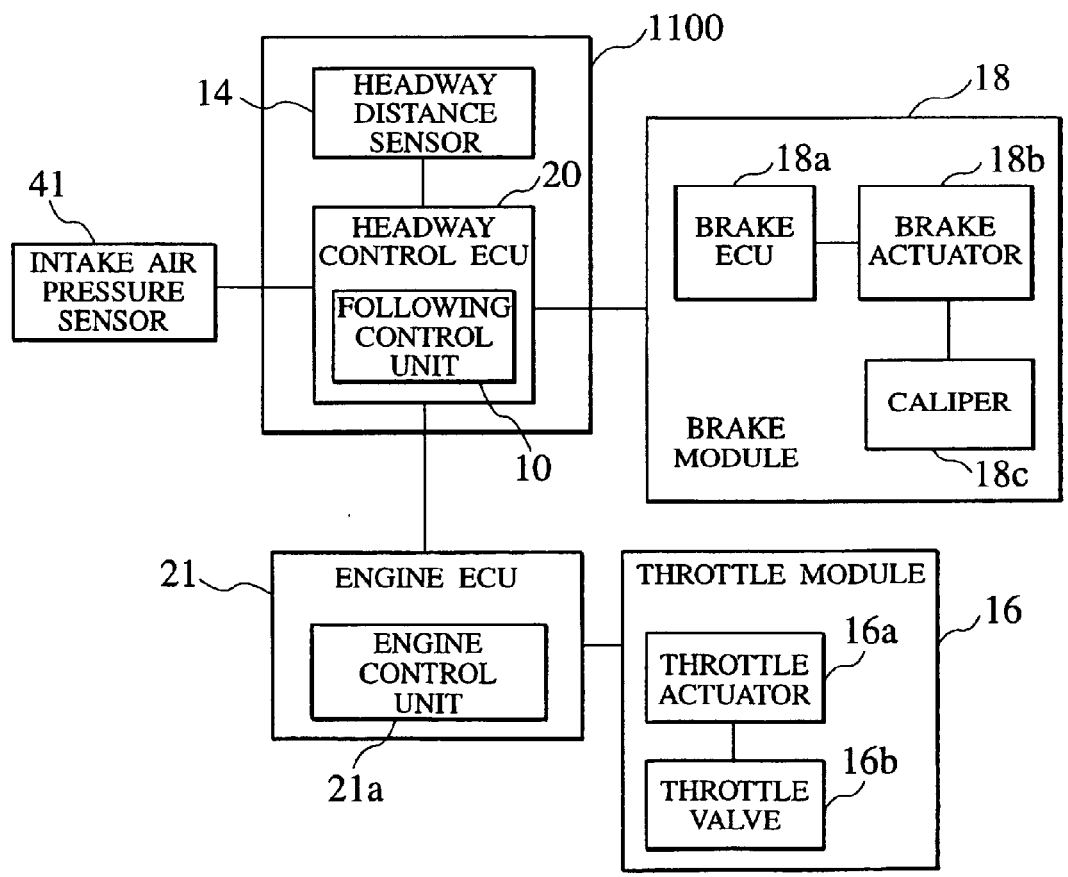
FIG. 5 is a block diagram showing a configuration of the headway control system 1100 according to the second embodiment of the present invention mounted in a vehicle.

A headway control system 1100 provided with a traffic congestion following function according to a second embodiment of the present invention will be explained with reference to FIGS. 4 through 6.

The headway control system 1100 according to the second embodiment of the present invention is configured so as to perform the congestion following processing by detecting an engine positive pressure that builds up as the throttle valve opens when the vehicle is started. In the headway control system 1100 according to the second embodiment, therefore, the following control unit 10 is connected to an intake air pressure sensor 41 provided for the vehicle engine as shown in FIGS. 4 and 5. It is otherwise constructed in the same manner as the headway control system 1000 according to the first embodiment.

When the vehicle is started as the driver operates the accelerator pedal or any other switch, an intake air pressure that builds up as the throttle valve opens is detected by the intake air pressure sensor 41. When the intake air pressure reaches a positive pressure, the intake air pressure sensor 41 outputs an intake air pressure increase signal. If the system is currently in the congestion stop mode, the headway control ECU 20 shown in FIG. 5 shifts the mode to the congestion following mode as soon as it receives the intake air positive pressure signal from the intake air pressure sensor 41. The ECU 20 then outputs a brake fluid pressure cancellation signal to the brake module 18 and a throttle opening signal to the throttle module 16 to start a headway control.

Figure 3:
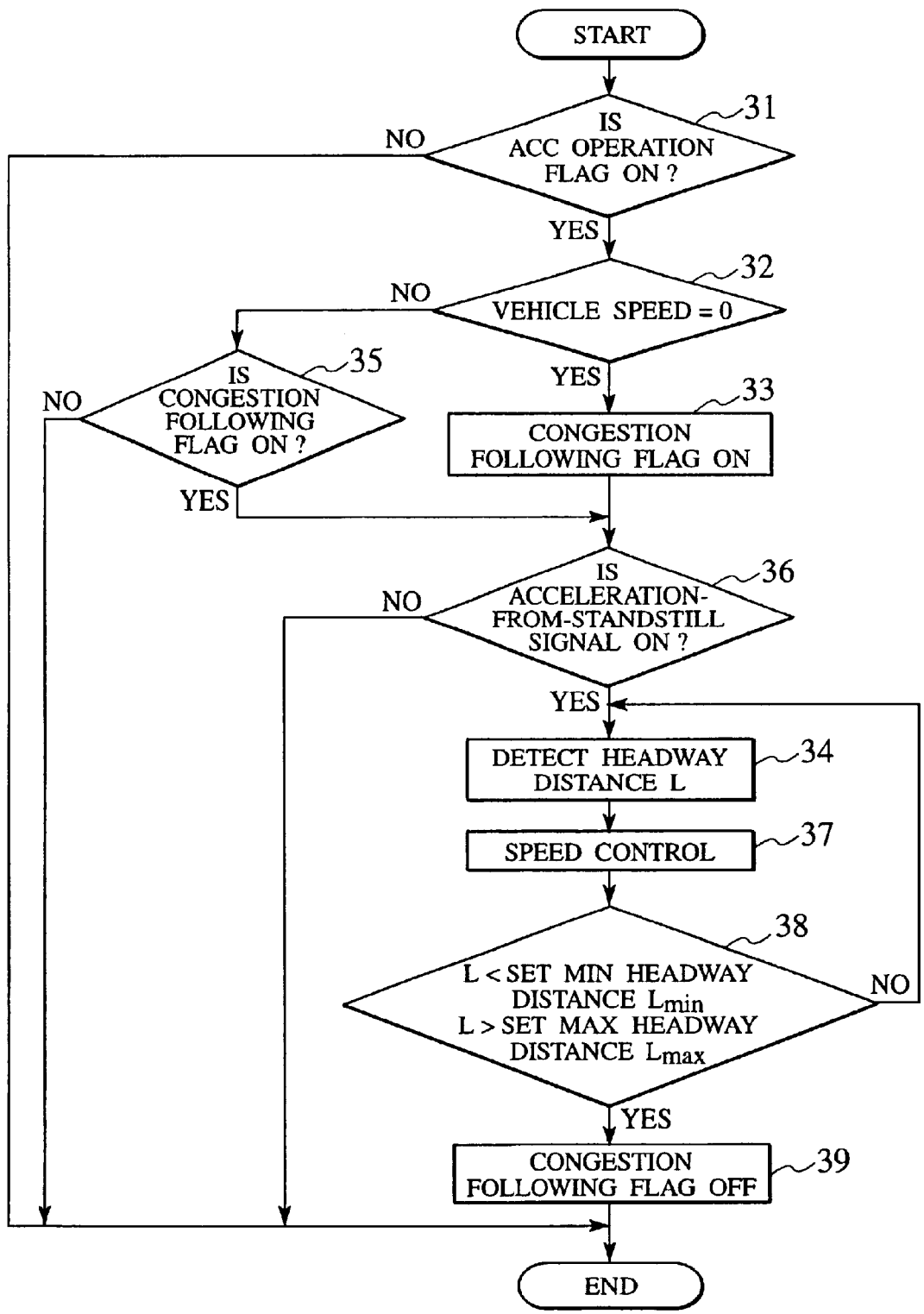
FIG. 3 is a flowchart showing control operations performed by a following control unit 10 of the headway control system 1000 according to the first embodiment of the present invention.
Figure 6:
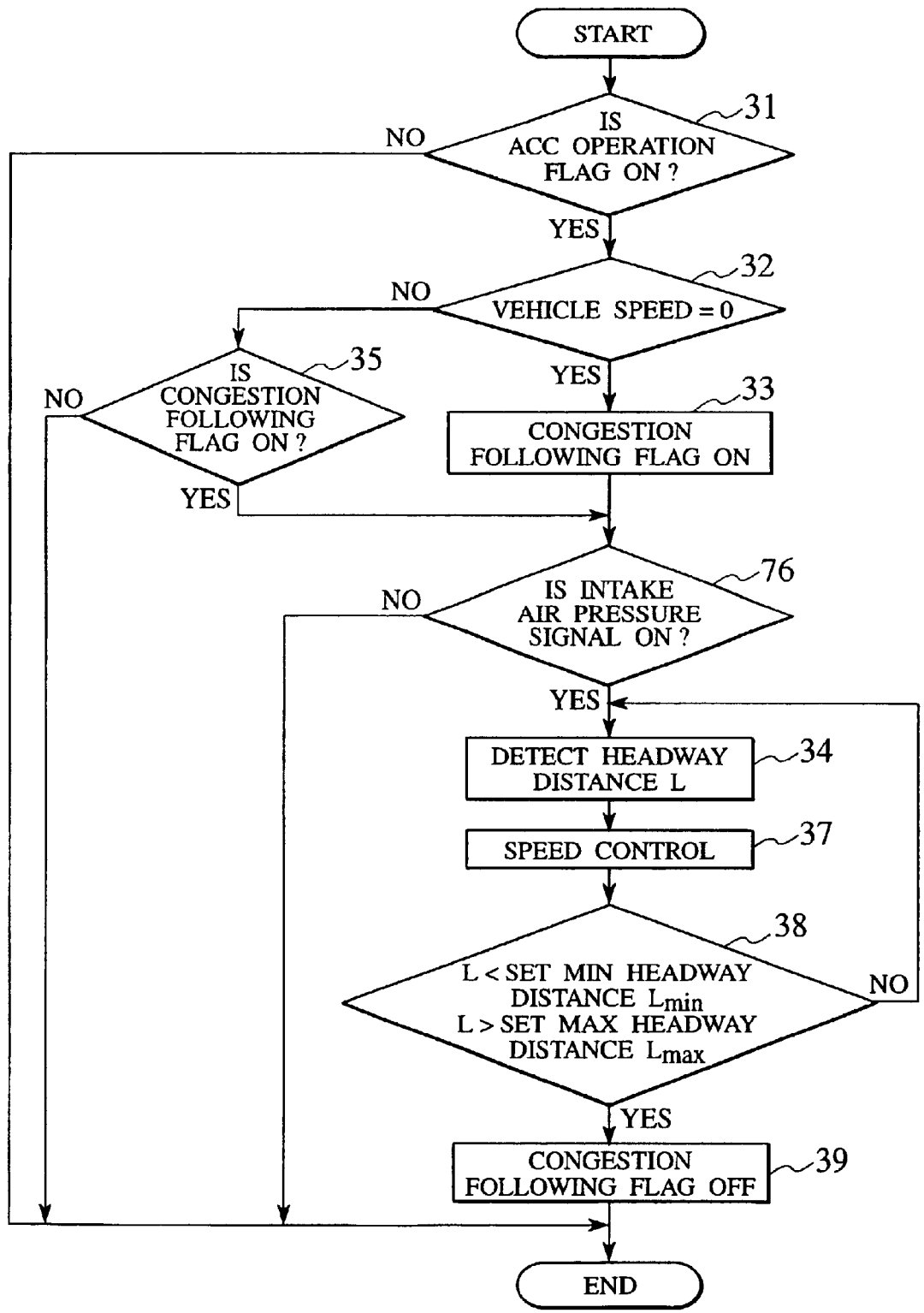
FIG. 6 is a flowchart showing control operations performed by a following control unit 10 of the headway control system 1100 according to the second embodiment of the present invention.

Referring to FIG. 6, the control flow of the following control unit 10 of the headway control ECU 20 is basically the same as that shown in FIG. 3 for the first embodiment. If the congestion following flag is set to ON in step 33, however, it is determined in step 76 whether or not the intake air pressure sensor 41 outputs an intake air positive pressure signal. If it is determined in step 76 that the intake air positive pressure signal is being output, the headway distance L is detected and the speed is controlled in steps 34 and 37.

As explained in the foregoing paragraphs, the headway control system 1100 according to the second embodiment uses, as the trigger to start the congestion following processing, the intake air pressure, or a characteristic value produced when the vehicle is operated for starting. The operation used for starting the vehicle, including the operation on the accelerator pedal, is therefore the same as that used in ordinary driving, as in the first embodiment. The driver has only to perform the same operation to start the host vehicle as in ordinary driving, when the preceding vehicle starts moving in traffic. This means that the congestion following processing is started through an operation quite natural to the driver's intention to follow the preceding vehicle in traffic.

Third Embodiment

A headway control system 1200 provided with a traffic congestion following function according to a third embodiment of the present invention will be explained with reference to FIGS. 7 through 10.

Figure 7:
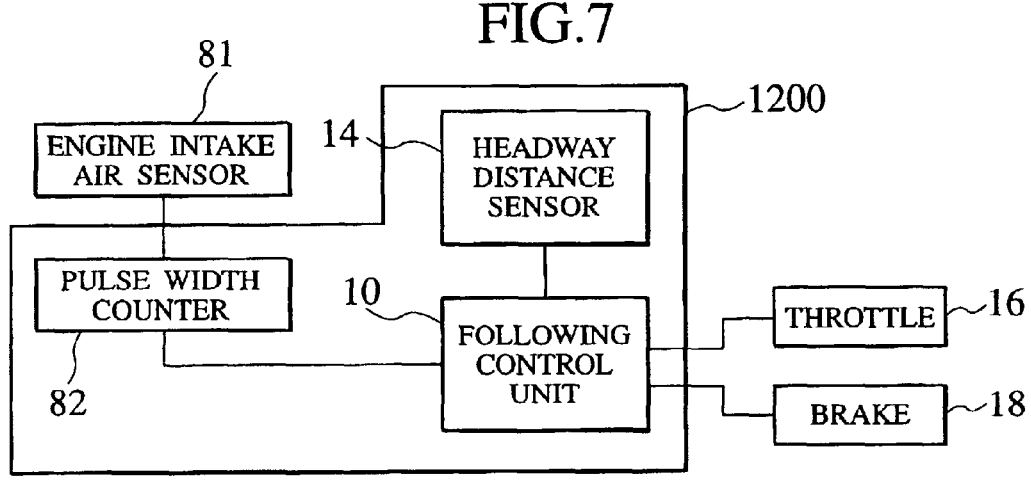
FIG. 7 is a block diagram showing a schematic configuration of a headway control system 1200 according to a third embodiment of the present invention.
Figure 8:
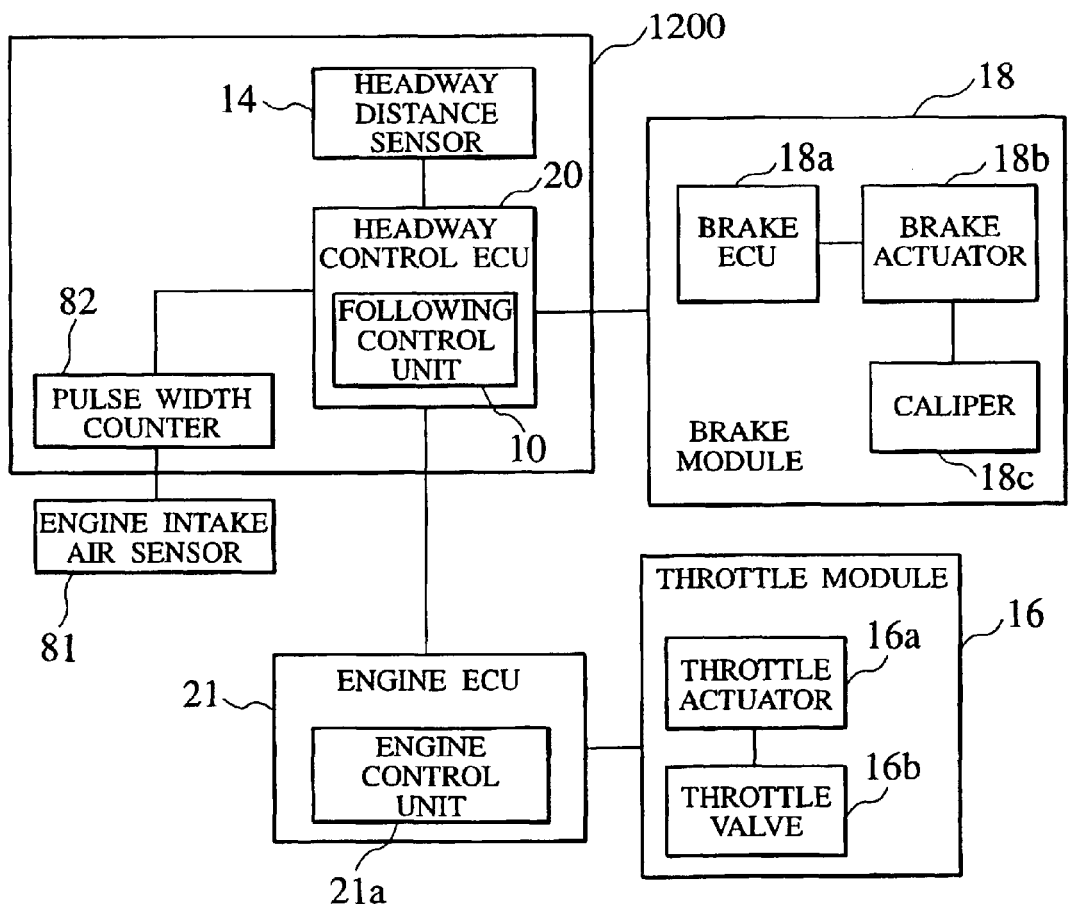
FIG. 8 is a block diagram showing a configuration of the headway control system 1200 according to the third embodiment of the present invention mounted in a vehicle.

The headway control system 1200 according to the third embodiment of the present invention is configured so as to set the congestion following mode by detecting an increase in an injection pulse width occurring as the vehicle is started. The headway control system 1200 according to the third embodiment therefore includes a pulse width counter 82 connected to the following control unit 10 as shown in FIGS. 7 and 8. The pulse width counter 82 is connected to an engine intake air sensor 81 provided for the vehicle engine.

When the host vehicle is started as the driver operates the accelerator pedal or any other switch, the injection pulse width increases with the increased fuel injection amount. The pulse width counter 82 obtains an injection reference pulse width through calculation using an amount of engine intake air found through an input from the engine intake air sensor 81. It is then determined, using the pulse width, whether or not the host vehicle is being started. If it is determined that the host vehicle is being started, then the counter 82 outputs a starting signal to the following control unit 10.

Figure 9:
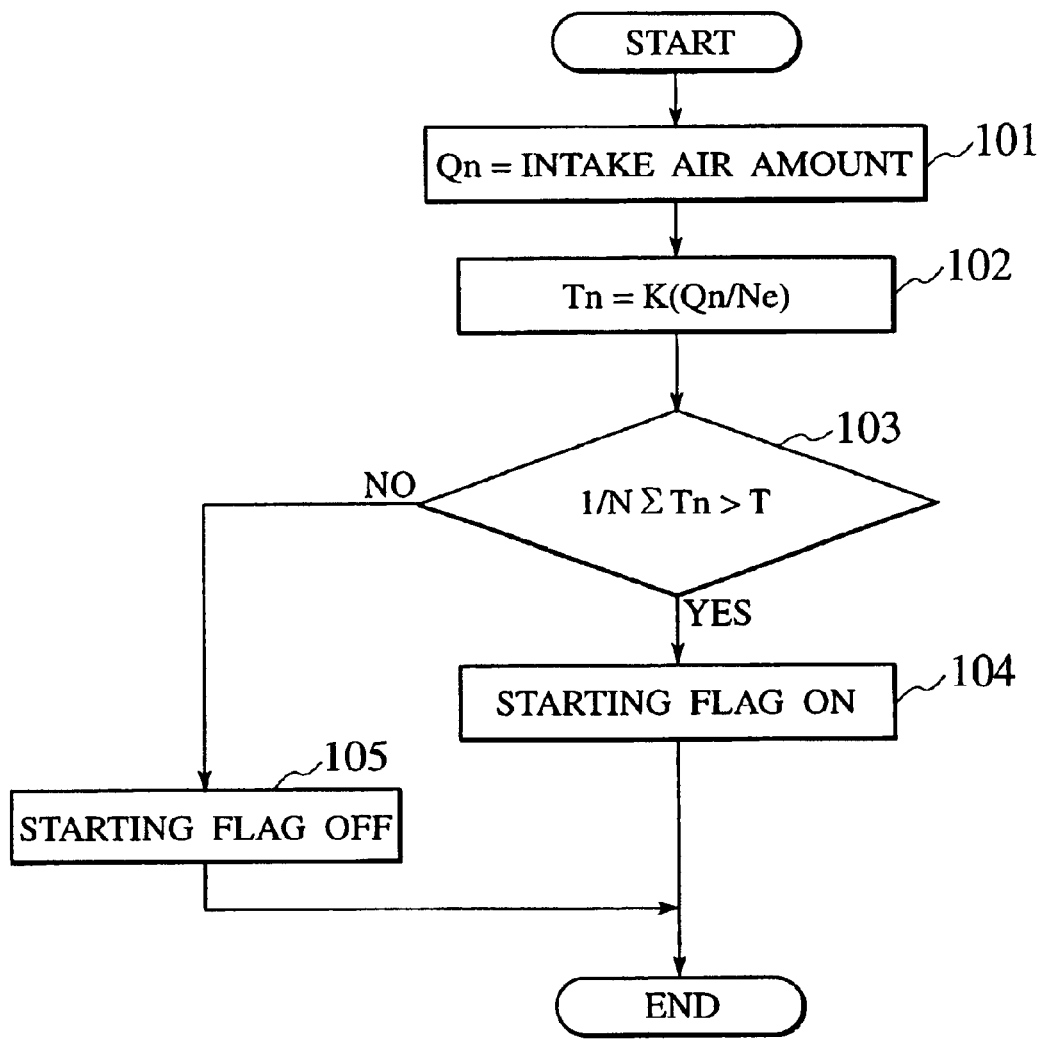
FIG. 9 is a flowchart showing operations performed by a pulse width counter of the headway control system 1200 according to the third embodiment of the present invention.

According to the third embodiment of the invention, the operation of the pulse width counter 82 is performed when the CPU executes the program as shown in the operation flow of FIG. 9. Counting of the injection pulse width shown in the flow of FIG. 9 is done at predetermined intervals during the steps after step 100. First of all, a current intake air amount Qn is received from the engine intake air sensor 81 in step 101. In step 102, the intake air amount Qn is substituted for $Tn=K(Qn/Ne)$, thereby calculating an injection pulse width Tn. Where, Ne is a predetermined injection pulse frequency and K is a predefined coefficient. Measurement of steps 101 and 102 is repeated at predetermined intervals.

In step 103, an average of the injection pulse width Tn so far measured N times is obtained. If the average is a predetermined value T or more, then the control proceeds to step 104, in which a starting flag is set to ON. If the average is less than T, control proceeds to step 105, in which the starting flag is set to OFF.

Figure 10:
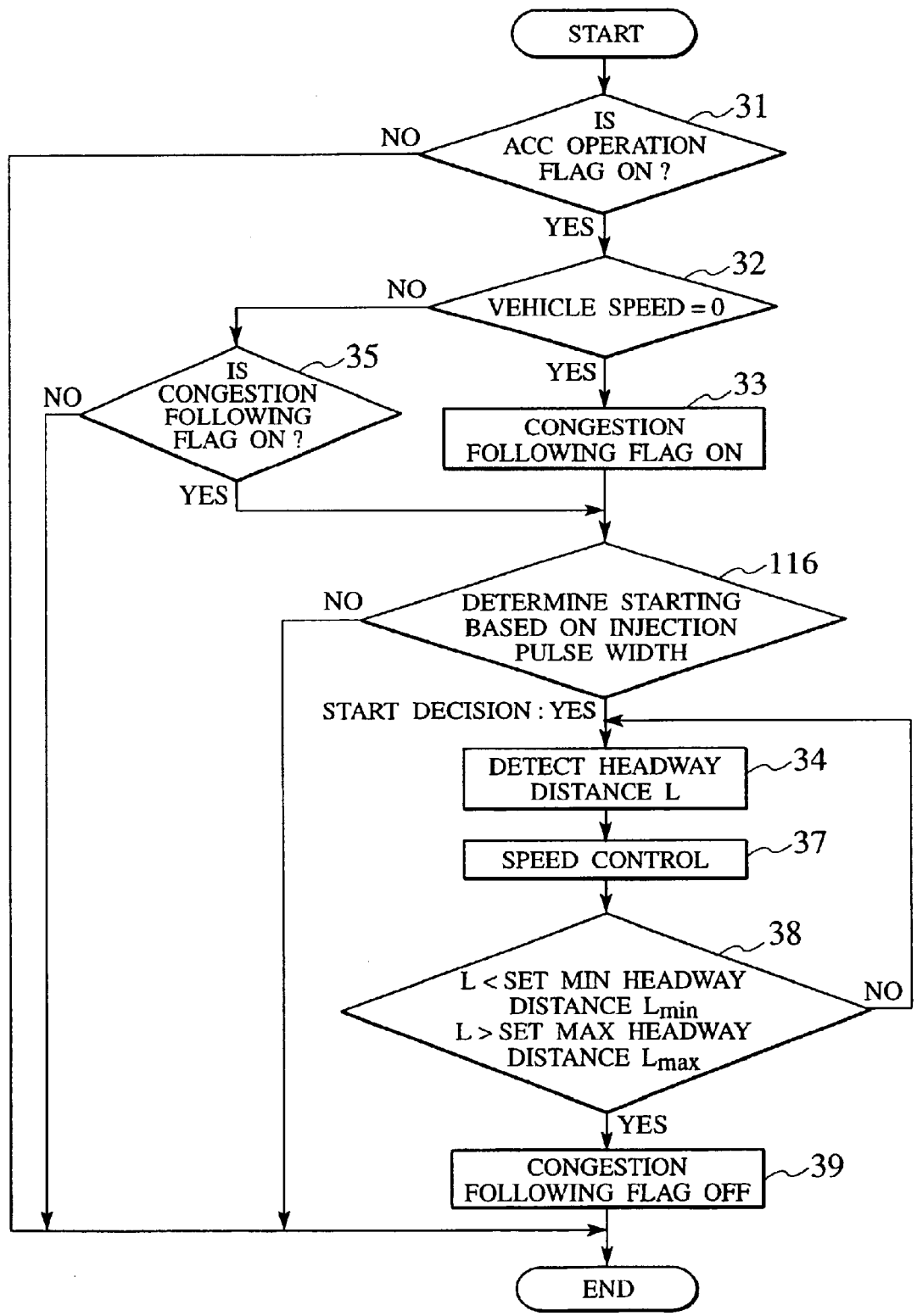
FIG. 10 is a flowchart showing control operations performed by a following control unit 10 of the headway control system 1200 according to the third embodiment of the present invention.

The following control unit 10 of the headway control ECU 20 determines whether the starting flag is ON or not in step 116 as shown in FIG. 10. If the flag is found to be ON, the control unit 10 considers that a starting operation has been performed and performs the following processing in steps 34 and 37. The rest of the processing is the same as that shown in FIG. 3 for the first embodiment and the explanation for it will be omitted.

As explained in the foregoing paragraphs, the headway control system 1200 according to the third embodiment uses, as the trigger to start the congestion following processing, the injection pulse width, or a characteristic value produced when the vehicle is operated for starting. The operation used for starting the vehicle, including the operation on the accelerator pedal, is therefore the same as that used in ordinary driving, as in the first embodiment. The third embodiment therefore offers the effect that the driver has only to perform the same operation to start the host vehicle as in ordinary driving, when the preceding vehicle starts moving in traffic.

Fourth Embodiment

Figure 11:
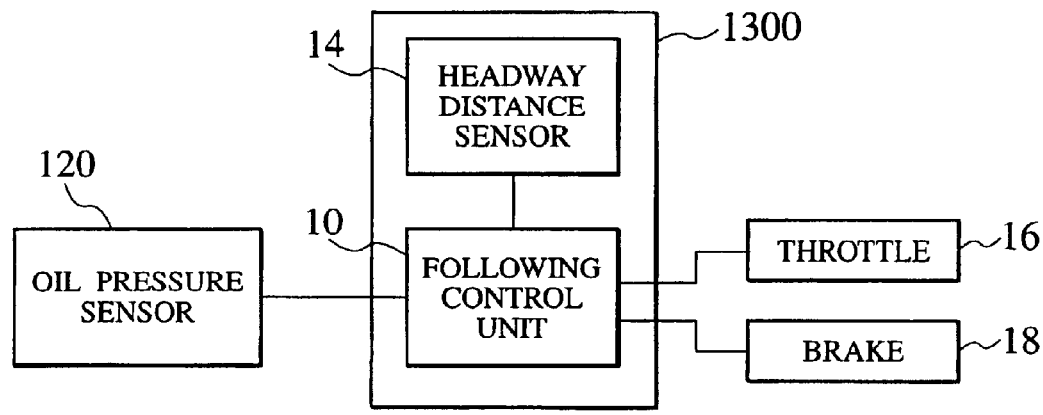
FIG. 11 is a block diagram showing a schematic configuration of a headway control system 1300 according to a fourth embodiment of the present invention.
Figure 12:
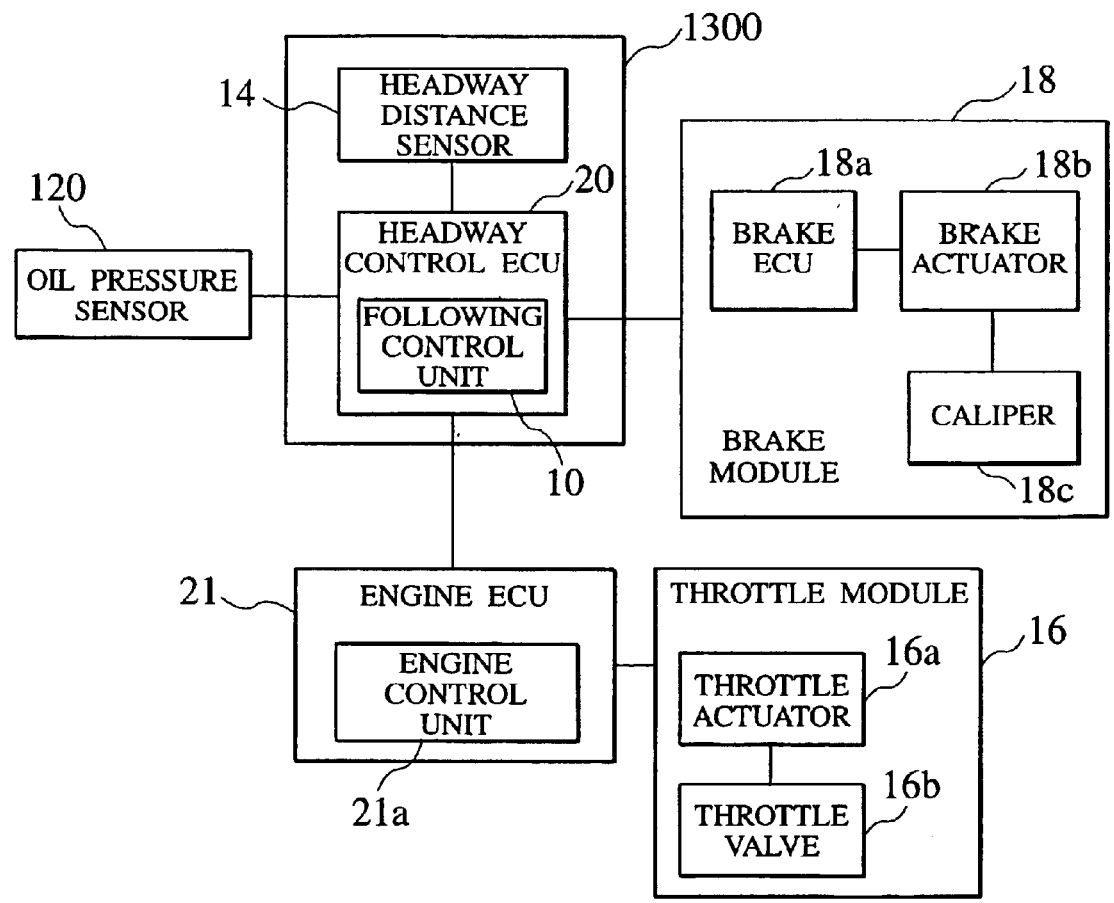
FIG. 12 is a block diagram showing a configuration of the headway control system 1300 according to the fourth embodiment of the present invention mounted in a vehicle.

A headway control system 1300 provided with a traffic congestion following function according to a fourth embodiment of the present invention will be explained with reference to FIGS. 11 through 13.

The headway control system 1300 according to the fourth embodiment of the present invention is configured so as to carry out the congestion following processing in the following condition. Namely, it performs the processing when an engine oil pressure is a predetermined value or more as found by detecting an increase in the engine oil pressure as a result of the engine speed being increased when the vehicle is started. In the headway control system 1300 according to the fourth embodiment, therefore, the following control unit 10 is connected to an oil pressure sensor 120 provided for the vehicle engine as shown in FIGS. 11 and 12. It is otherwise constructed in the same manner as the headway control system 1000 according to the first embodiment.

When the host vehicle is started as the driver operates the accelerator pedal or any other switch, the oil pressure sensor 120 detects an increase in the oil pressure as the engine speed increases. When the detected oil pressure is the predetermined value or more, the sensor 120 outputs an oil pressure increase signal to the headway control ECU 20. If the system is currently in the congestion stop mode, the headway control ECU 20 shifts the mode to the congestion following mode as soon as it receives the oil pressure increase signal from the oil pressure sensor 120. The ECU 20 then outputs a brake fluid pressure cancellation signal to the brake module 18 and a throttle opening signal to the throttle module 16 to start a headway control.

Figure 13:
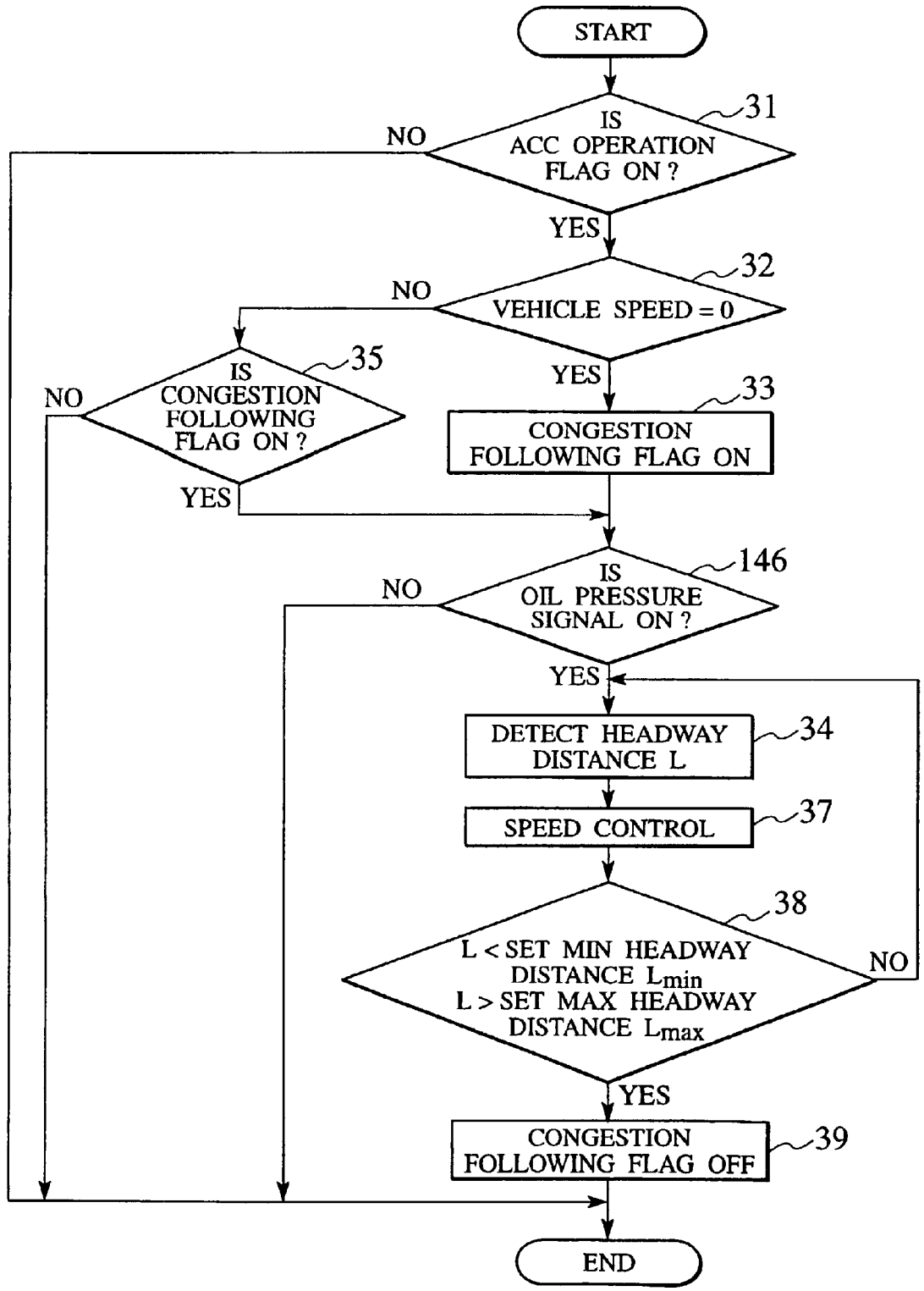
FIG. 13 is a flowchart showing control operations performed by a following control unit 10 of the headway control system 1300 according to the fourth embodiment of the present invention.

Referring to FIG. 13, the control flow of the following control unit 10 of the headway control ECU 20 is basically the same as that shown in FIG. 3 for the first embodiment. If the congestion following flag is set to ON in step 33, however, it is determined in step 146 whether or not the oil pressure sensor 120 outputs an oil pressure increase signal. If it is determined in step 146 that the oil pressure increase signal is being output, the headway distance L is detected and the speed is controlled in steps 34 and 37.

As explained in the foregoing paragraphs, the headway control system 1300 according to the fourth embodiment uses, as the trigger to start the congestion following processing, the oil pressure signal, or a characteristic value produced when the vehicle is operated for starting. The operation used for starting the vehicle, including the operation on the accelerator pedal, is therefore the same as that used in ordinary driving, as in the first embodiment. The fourth embodiment therefore offers the effect that the driver has only to perform the same operation to start the host vehicle as in ordinary driving, when the preceding vehicle starts moving in traffic.

Fifth Embodiment

Figure 14:
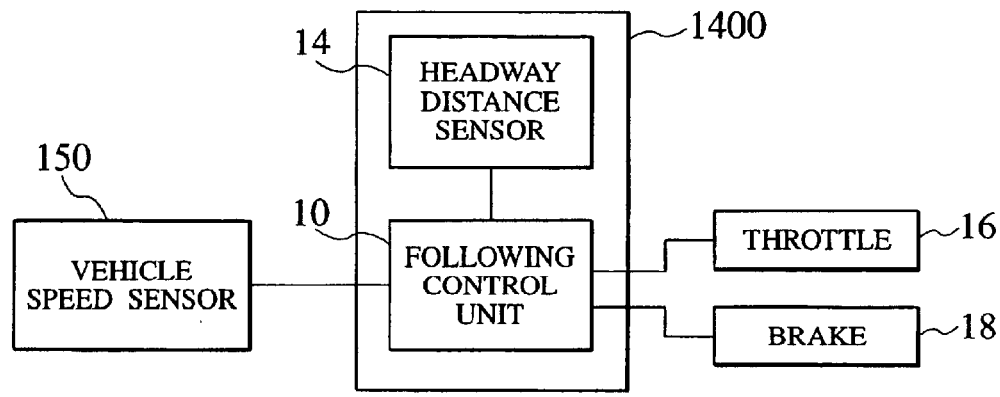
FIG. 14 is a block diagram showing a schematic configuration of a headway control system 1400 according to a fifth embodiment of the present invention.
Figure 15:
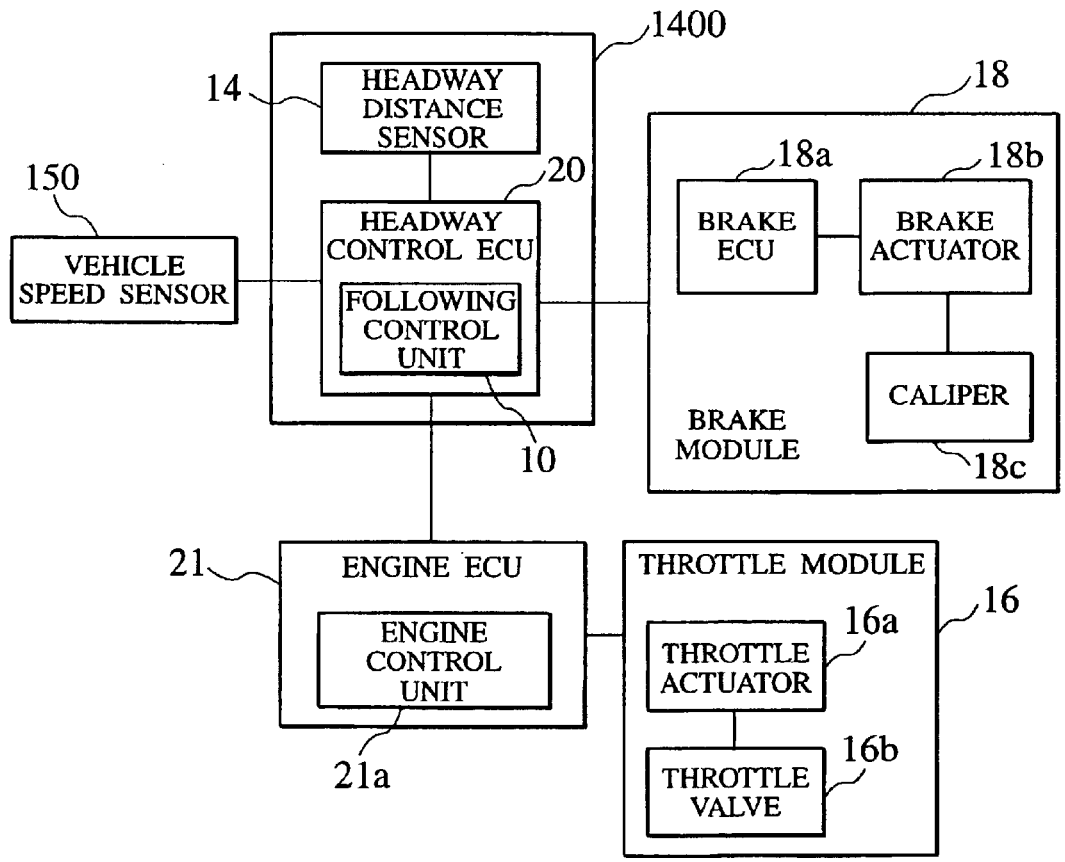
FIG. 15 is a block diagram showing a configuration of the headway control system 1400 according to the fifth embodiment of the present invention mounted in a vehicle.

A headway control system 1400 provided with a traffic congestion following function according to a fifth embodiment of the present invention will be explained with reference to FIGS. 14 through 16.

The headway control system 1400 according to the fifth embodiment of the present invention is configured so as to carry out the congestion following processing when a vehicle speed, as detected by the system, becomes a predetermined value or more as it increases when the vehicle is started. In the headway control system 1400 according to the fifth embodiment, therefore, the following control unit 10 is connected to a vehicle speed sensor 150 provided for the vehicle as shown in FIGS. 14 and 15. It is otherwise constructed in the same manner as the headway control system 1000 according to the first embodiment.

When the host vehicle is started as the driver operates the accelerator pedal or any other switch, the vehicle speed sensor 150 detects the vehicle speed. If the detected vehicle speed is the predetermined value or more, the sensor 150 sends a vehicle speed available signal to the headway control ECU 20. If the system is currently in the congestion stop mode, the headway control ECU 20 shifts the mode to the congestion following mode as soon as it receives the vehicle speed available signal from the vehicle speed sensor 150. The ECU 20 then outputs a brake fluid pressure cancellation signal to the brake module 18 and a throttle opening signal to the throttle module 16 to start a headway control.

Figure 16:
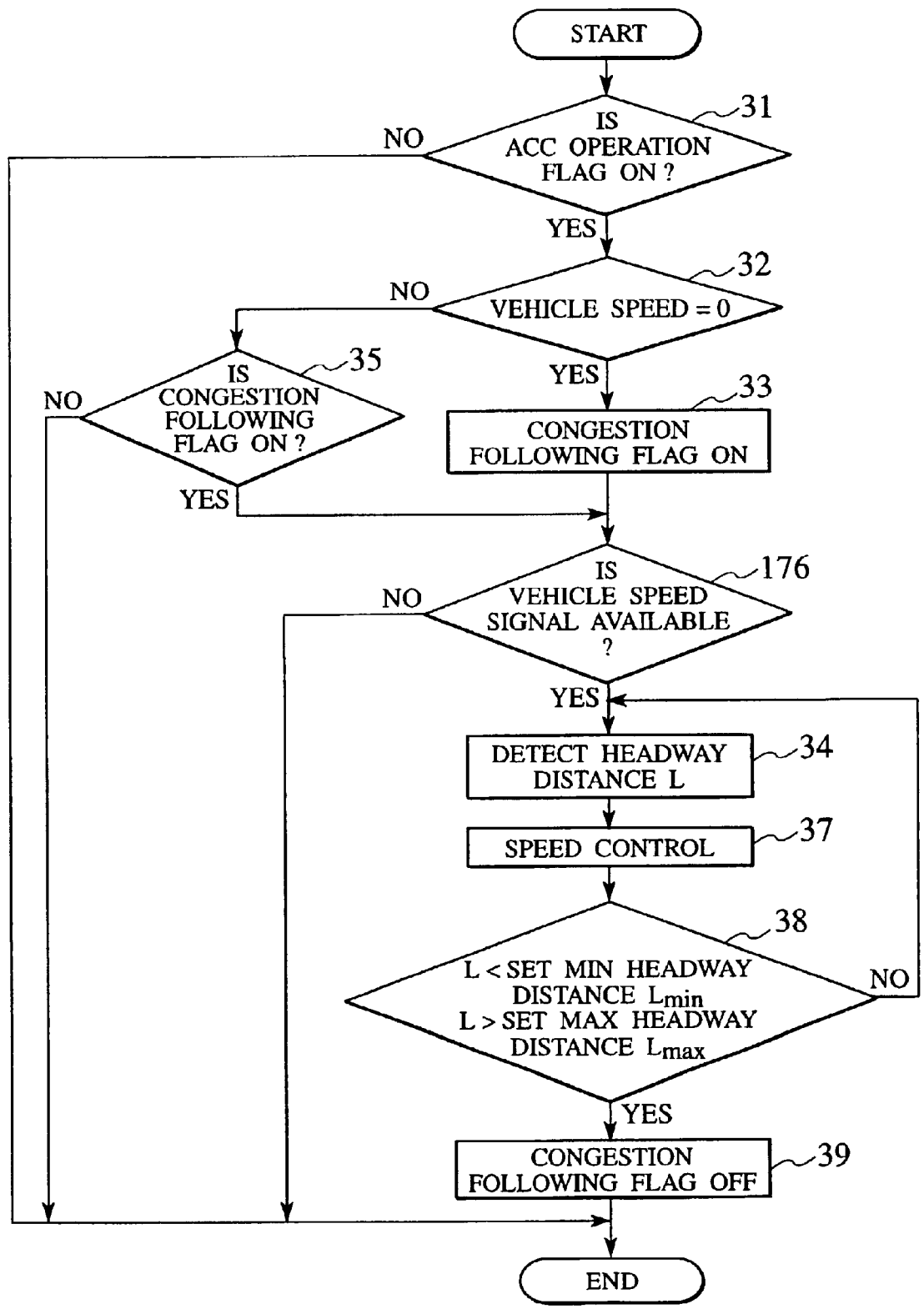
FIG. 16 is a flowchart showing control operations performed by a following control unit 10 of the headway control system 1400 according to the fifth embodiment of the present invention.

Referring to FIG. 16, the control flow of the following control unit 10 of the headway control ECU 20 is basically the same as that shown in FIG. 3 for the first embodiment. If the congestion following flag is set to ON in step 33, however, it is determined in step 176 whether or not the vehicle speed sensor 150 outputs a vehicle speed available signal. If it is determined in step 176 that the vehicle speed available signal is being output, the headway distance L is detected and the speed is controlled in steps 34 and 37.

As explained in the foregoing paragraphs, the headway control system 1400 according to the fifth embodiment uses, as the trigger to start the congestion following processing, the vehicle speed, or a characteristic value produced when the vehicle is operated for starting. The operation used for starting the vehicle, including the operation on the accelerator pedal, is therefore the same as that used in ordinary driving, as in the first embodiment. The fifth embodiment therefore offers the effect that the driver has only to perform the same operation to start the host vehicle as in ordinary driving, when the preceding vehicle starts moving in traffic.

Sixth Embodiment

Figure 17:
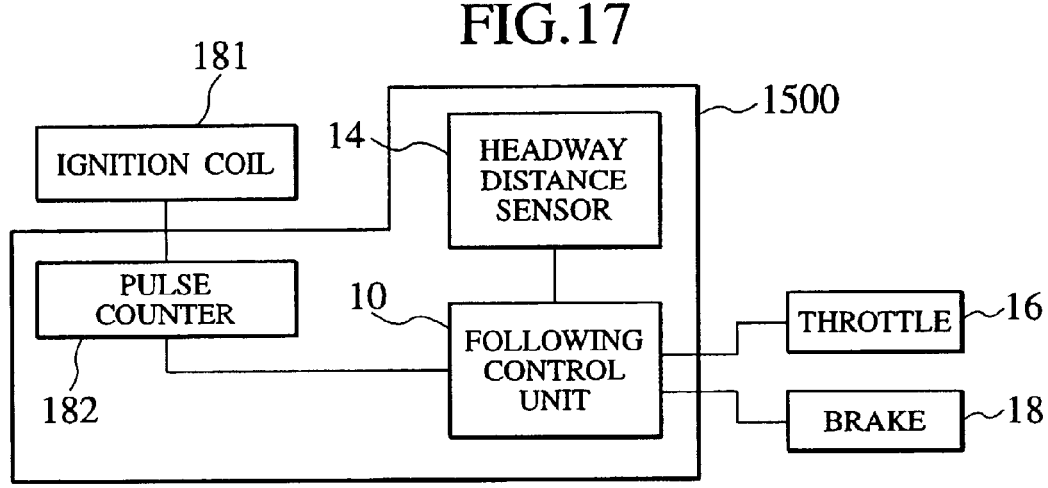
FIG. 17 is a block diagram showing a schematic configuration of a headway control system 1500 according to a sixth embodiment of the present invention.
Figure 18:
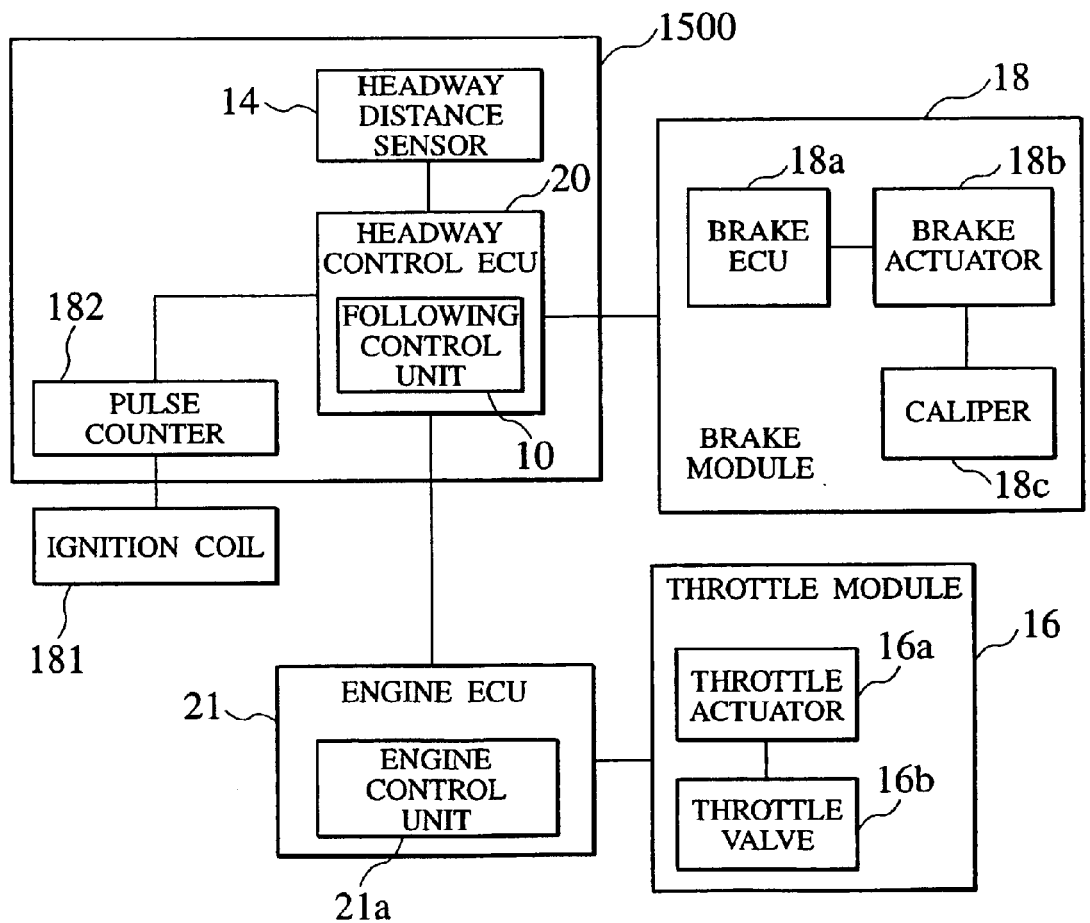
FIG. 18 is a block diagram showing a configuration of the headway control system 1500 according to the sixth embodiment of the present invention mounted in a vehicle.

A headway control system 1500 provided with a traffic congestion following function according to a sixth embodiment of the present invention will be explained with reference to FIGS. 17 through 19.

The headway control system 1500 according to the sixth embodiment of the present invention is configured so as to carry out the congestion following processing by detecting, in terms of an increase in the number of ignition pulses, an increase in the engine speed as it occurs when the vehicle is started. The headway control system 1500 according to the sixth embodiment, therefore, includes a pulse counter 182 connected to the following control unit 10 as shown in FIGS. 17 and 18. The pulse counter 182 is connected to an ignition coil 181 of the vehicle engine.

The pulse counter 182 detects the engine speed by counting the number of ignition pulses of the ignition coil 181. If the counter 182 detects a speed of a predetermined value or higher, it outputs a starting signal to the engine ECU 20. An operation of the pulse counter 182 according to the sixth embodiment of the invention is performed when the CPU executes a program for performing the operation of the counter 182. The pulse counter 182 counts the number of ignition pulses at predetermined intervals and updates the output to the engine ECU 20 at each of these events.

Figure 19:
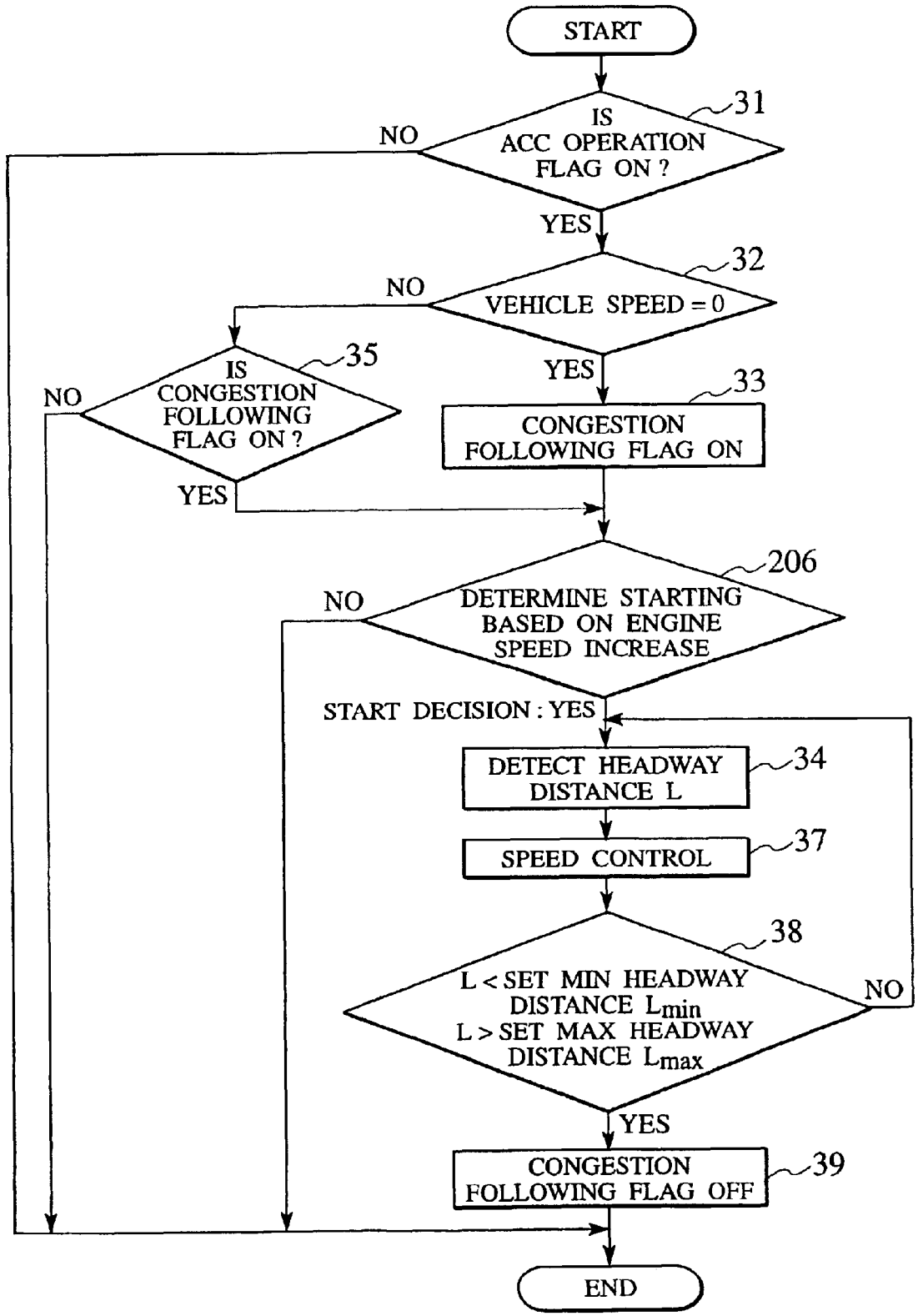
FIG. 19 is a flowchart showing control operations performed by a following control unit 10 of the headway control system 1500 according to the sixth embodiment of the present invention.

Referring to FIG. 19, the following control unit 10 of the headway control ECU 20 determines in step 206 whether or not a starting signal from the pulse counter 182 is being input. If it is determined that the signal is being input, the control unit 10 determines that a starting operation has been performed. It then performs the following processing in steps 34 and 37. An explanation of the rest of the steps is omitted, as they are the same as those shown in FIG. 3 for the first embodiment.

As explained in the foregoing paragraphs, the headway control system 1500 according to the sixth embodiment uses, as the trigger to start the congestion following processing, the engine speed, or a characteristic value produced when the vehicle is operated for starting. The operation used for starting the vehicle, including the operation on the accelerator pedal, is therefore the same as that used in ordinary driving, as in the first embodiment. The sixth embodiment therefore offers the effect that the driver has only to perform the same operation to start the host vehicle as in ordinary driving, when the preceding vehicle starts moving in traffic.

Seventh Embodiment

Figure 20:
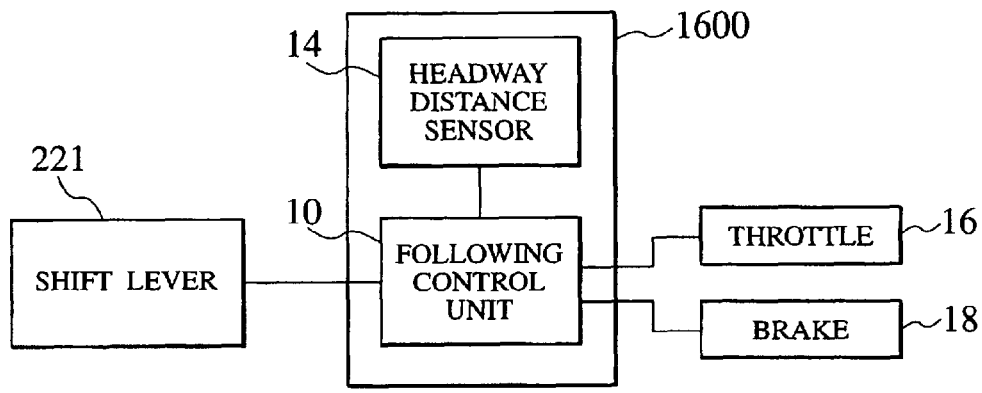
FIG. 20 is a block diagram showing a schematic configuration of a headway control system 1600 according to a seventh embodiment of the present invention.
Figure 21:
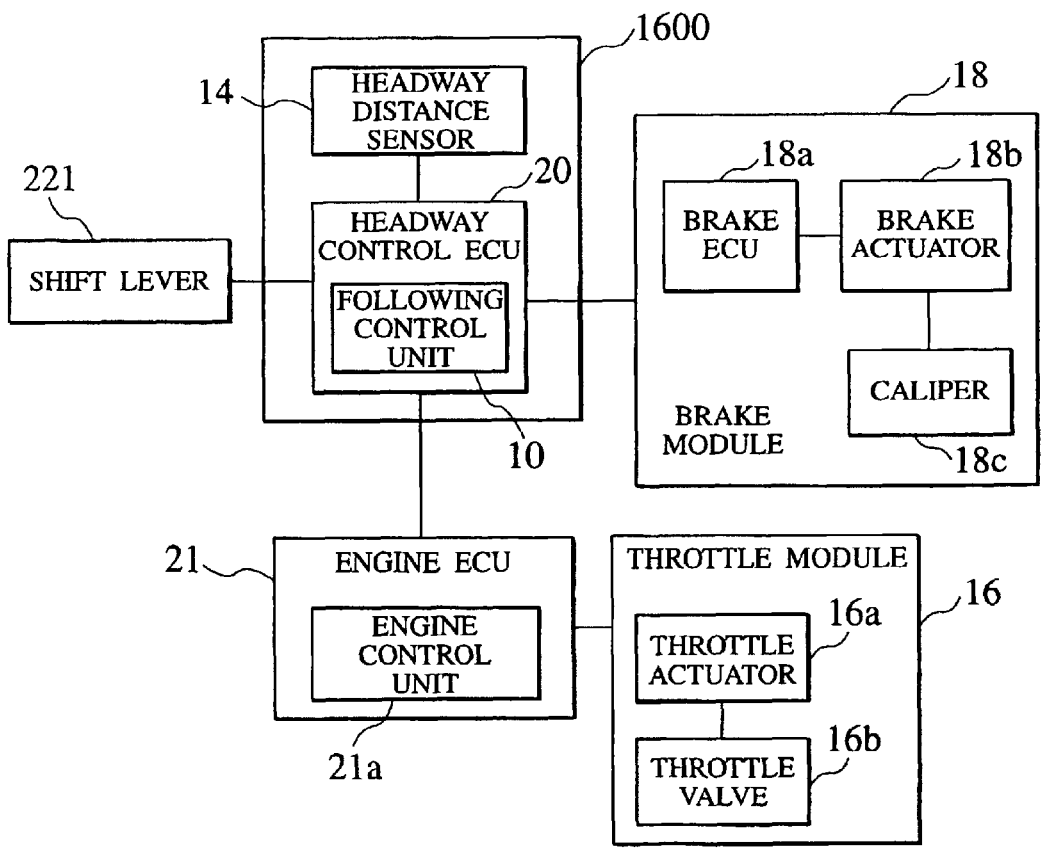
FIG. 21 is a block diagram showing a configuration of the headway control system 1600 according to the seventh embodiment of the present invention mounted in a vehicle.

A headway control system 1600 provided with a traffic congestion following function according to a seventh embodiment of the present invention will be explained with reference to FIGS. 20 through 22.

The headway control system 1600 according to the seventh embodiment of the present invention performs the congestion following processing on condition that the system is in the congestion stop mode, the preceding vehicle has started, the transmission shift lever of the host vehicle is in the drive range, and the brake of the host vehicle is not being applied. A shift lever 221 is therefore connected to the following control unit 10 of the headway control system 1600 according to the seventh embodiment of the invention as shown in FIGS. 20 and 21.

Figure 22:
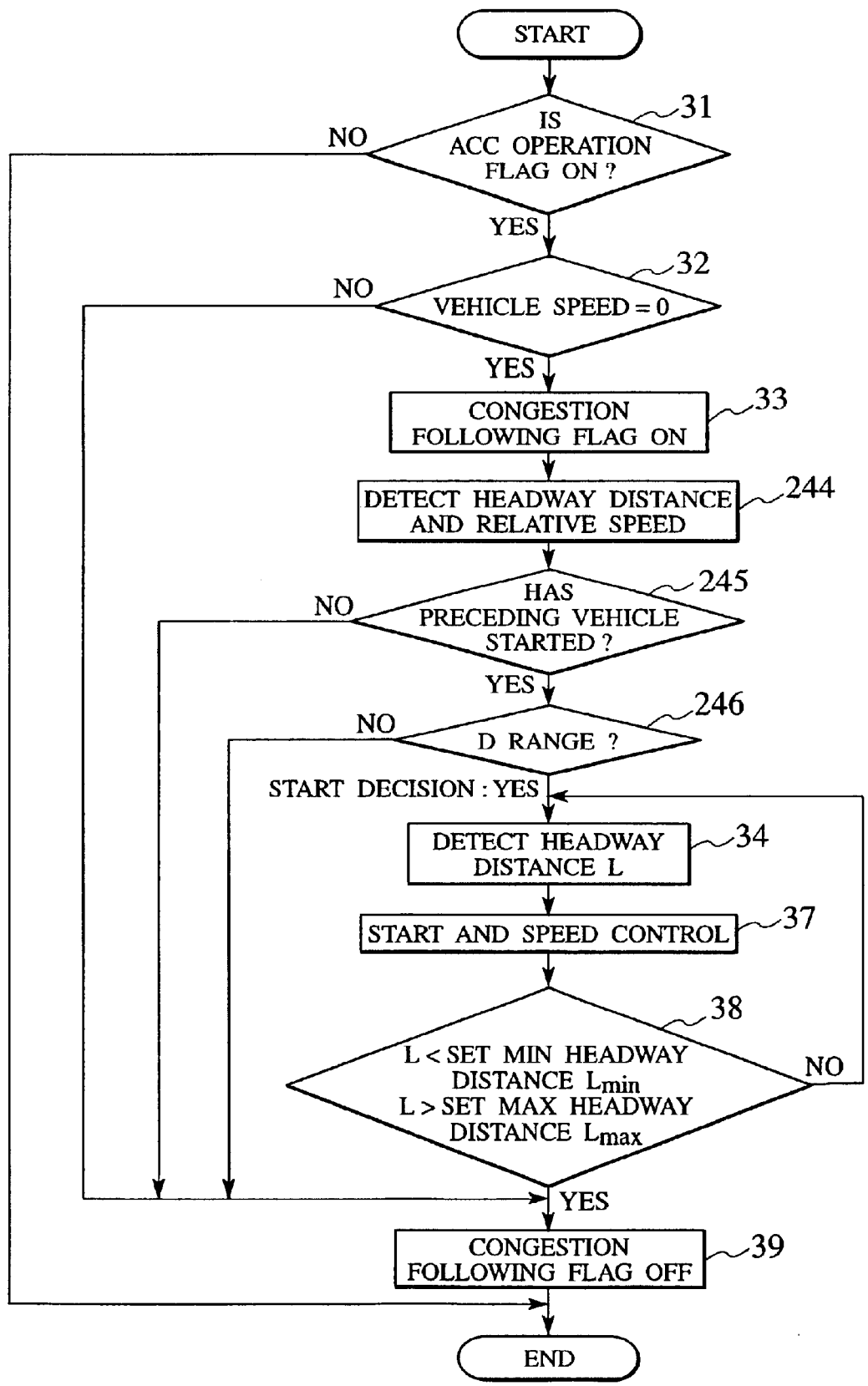
FIG. 22 is a flowchart showing control operations performed by a following control unit 10 of the headway control system 1600 according to the seventh embodiment of the present invention.

The control operation of the following control unit 10 of the headway control ECU 20 is the same as that for the first embodiment up to step 33, in which the congestion following flag is set to ON, as shown in FIG. 22. Following step 33, the headway distance sensor 14 detects the headway distance from the preceding vehicle and the relative speed (in step 244). If it is detected from the detection results that the preceding vehicle has started, then it is further detected whether the shift lever 221 is in the drive range. If it is, the control proceeds to steps 34, 37, and 38, in which the speed control processing as in the first embodiment is performed (in steps 245 and 246). If the driver depresses the brake pedal even if the shift lever 221 is in the drive range, however, the control does not proceed to steps 34, 37, and 38. If the headway distance L is less than the set minimum headway distance $L_{min}$ or greater than the set maximum headway distance $L_{max}$, the congestion following flag is set to OFF as in the first embodiment (in step 39).

As explained in the foregoing paragraphs, the headway control system 1600 according to the seventh embodiment starts the congestion following processing on condition that the shift lever is placed in the drive range. To start the congestion following processing when the preceding vehicle starts moving, therefore, the driver has only to place the shift lever in the drive range, or keep the shift lever in the drive range if he or she wants to follow the preceding vehicle. There is no need to operate the accelerator pedal.

Eighth Embodiment

Figure 23:
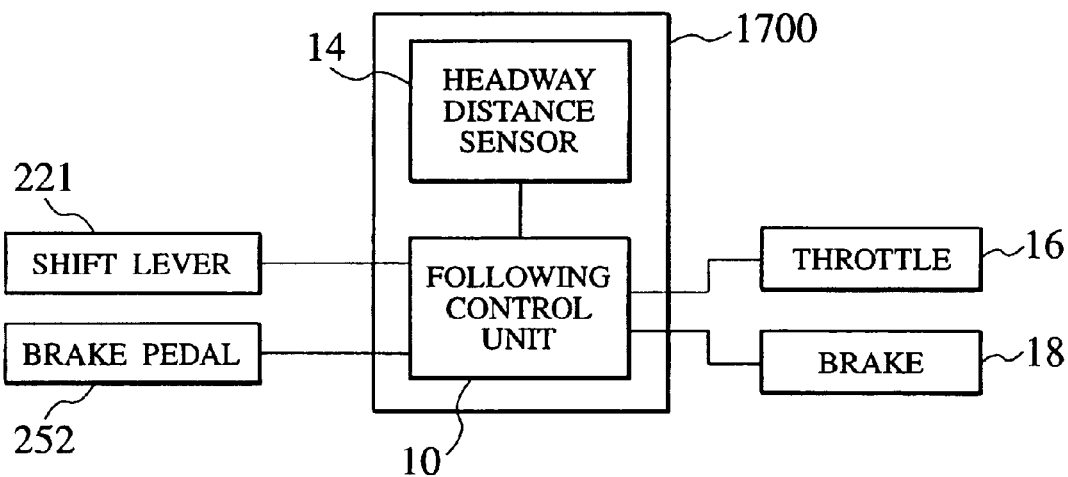
FIG. 23 is a block diagram showing a schematic configuration of a headway control system 1700 according to an eighth embodiment of the present invention.
Figure 24:
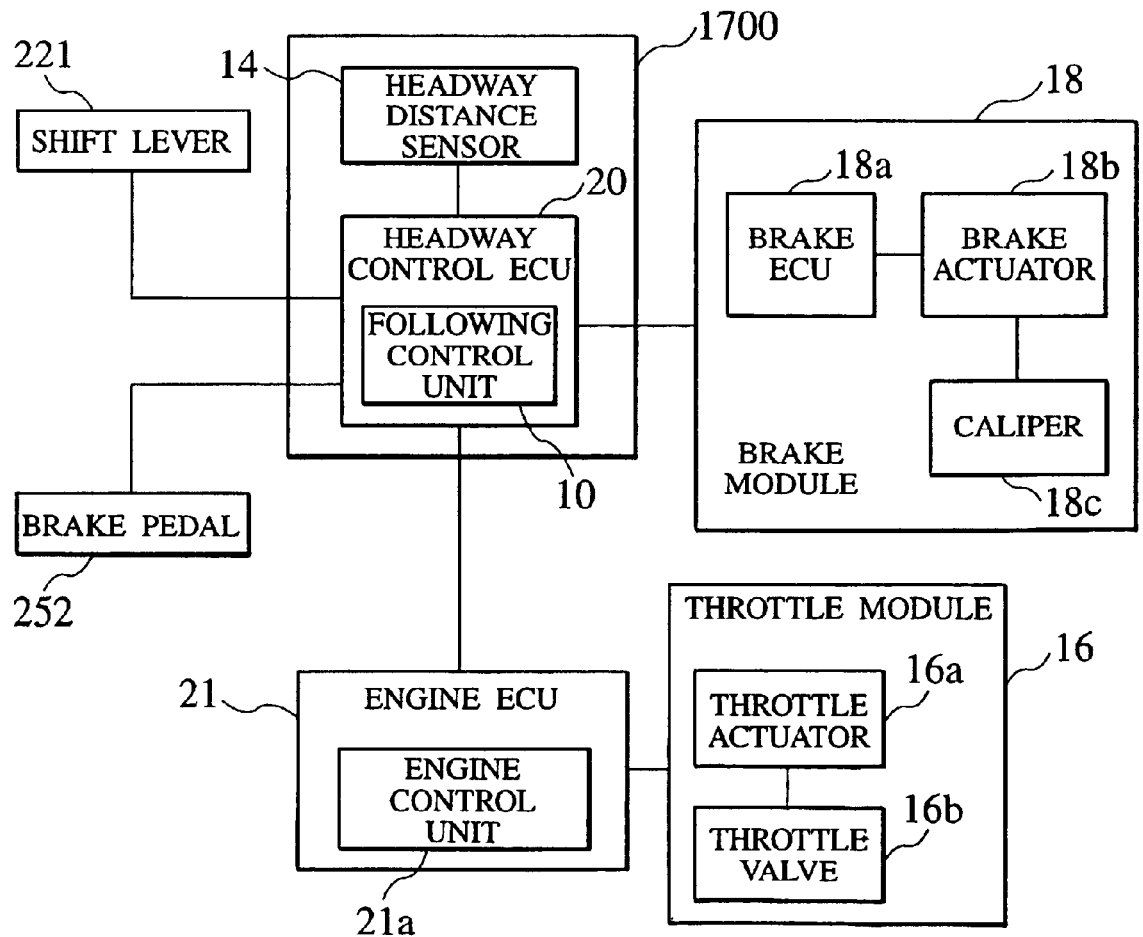
FIG. 24 is a block diagram showing a configuration of the headway control system 1700 according to the eighth embodiment of the present invention mounted in a vehicle.

A headway control system 1700 provided with a traffic congestion following function according to an eighth embodiment of the present invention will be explained with reference to FIGS. 23 through 25.

The headway control system 1700 according to the eighth embodiment of the present invention performs the congestion following processing on condition that the system is in the congestion stop mode, the preceding vehicle has started, the transmission shift lever of the host vehicle is in the drive range, and the driver has released the brake pedal from a depressed condition. The shift lever 221 and a brake pedal 252 are therefore connected to the following control unit 10 of the headway control system 1700 according to the eighth embodiment of the invention as shown in FIGS. 23 and 24.

Figure 25:
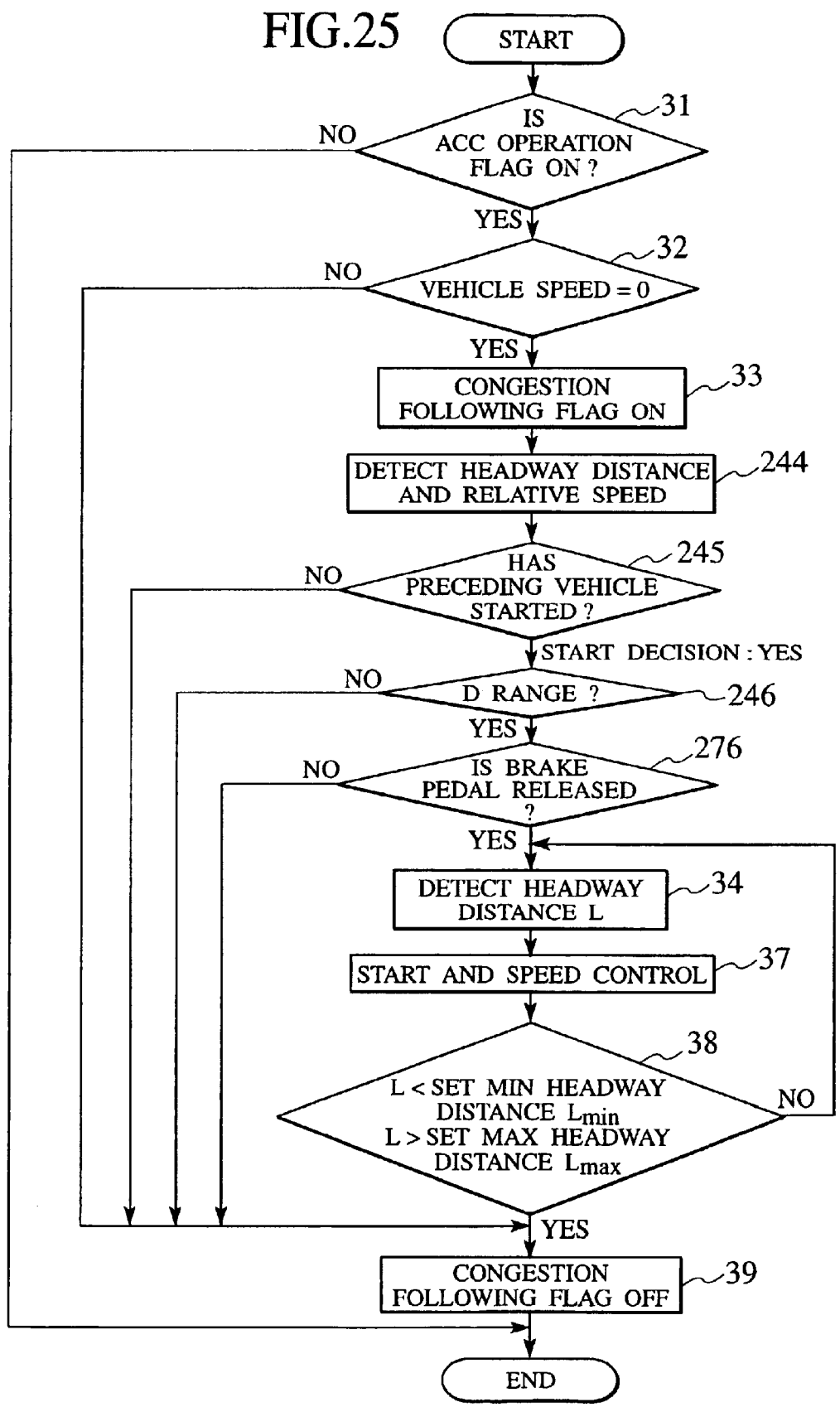
FIG. 25 is a flowchart showing control operations performed by a following control unit 10 of the headway control system 1700 according to the eighth embodiment of the present invention.

The control operation of the following control unit 10 of the headway control ECU 20 follows as follows as shown in FIG. 25. Namely, it is determined if the ACC is active or not (in step 31). If it is determined in step 32 that the vehicle speed is 0, it can then be determined that the preceding vehicle stops in congested traffic and the host vehicle follows it to stop. Then, the congestion following flag is set to ON. The driver waits in this condition with his or her foot on the brake pedal 252.

Following step 33, the headway distance sensor 14 detects the headway distance from the preceding vehicle and the relative speed (in step 244). If it is detected from the detection results that the preceding vehicle has started, then it is further detected whether the shift lever 221 is in the drive range. If it is, the control proceeds to step 276 (steps 245 and 246). If it is determined in step 276 that the driver releases the brake pedal 252, or the brake pedal 252 is in a released condition, the control proceeds to steps 34, 37, and 38, through which the speed control processing as in the first embodiment is performed. If the headway distance L is less than the set minimum headway distance $L_{min}$ or greater than the set maximum headway distance $L_{max}$, the congestion following flag is set to OFF as in the first embodiment (in step 39).

As explained in the foregoing paragraphs, the headway control system 1700 according to the eighth embodiment starts the congestion following processing on condition that the shift lever is placed in the drive range and, at the same time, the brake pedal 252 is not depressed. To start the congestion following processing when the preceding vehicle starts moving, therefore, the driver has only to place the shift lever in the drive range and release the brake pedal 252. Or, he or she has only to release the brake pedal 252 with the shift lever in the drive range when to start the host vehicle so as to follow the preceding vehicle. These operations are generally performed when to start the vehicle. This means that the following processing can be started through a natural sequence of operations.

According to the preferred embodiments of the present invention as described in the foregoing paragraphs, it is possible to realize the congestion following function without having to add any special operation control system. In addition, the congestion following function is activated with vehicle information, which varies when the driver performs a common, natural operation for starting the vehicle, used as a decision criterion. That is, it is possible to provide a congestion following device, for which an execution of congestion following can be instructed through an operation that is easy for the driver.

Moreover, according to each of the first through sixth embodiments, the following processing is initiated with a specific characteristic value produced in the vehicle when the driver attempts to start the vehicle used as a trigger. It is nonetheless possible to configure the system so that the following control unit 10 performs the following processing when either one, or two or more, of the characteristic values, including the acceleration and intake air pressure, are detected in the first through the sixth embodiments.

According to the present invention, a headway control system can be provided, in which the congestion following processing can be started by the same operation as in ordinary driving.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A vehicle headway control system, comprising:
  a following control unit that performs a following control which causes a host vehicle to follow a preceding vehicle in congested traffic;
  wherein, after the host vehicle has come to a standstill, the following control unit autonomously starts following control of the host vehicle upon detecting that a characteristic value generated in the host vehicle indicates that the host vehicle has started moving in response to a demand for a resumption of movement input by a driver.

2. The vehicle headway control system according to claim 1, wherein the following control unit performs the following control when acceleration of the vehicle reaches or exceeds a predetermined value.

3. The vehicle headway control system according to claim 1, wherein the following control unit performs following control when vehicle speed reaches or exceeds a predetermined value.

4. A vehicle headway control system, comprising:
  a following control unit that performs a following control which causes a host vehicle to follow a preceding vehicle in congested traffic;

wherein, after the host vehicle has come to a standstill, the following control unit autonomously starts following control of the host vehicle upon detecting a variation in operation of an engine of the host vehicle, which variation is indicative that the host vehicle has started moving in response to an input demand for a resumption of movement from the vehicle operator.

5. The vehicle headway control system according to claim 4, wherein said variation in operation of the engine comprises an increase of engine speed.

6. The vehicle headway control system according to claim 4, wherein said variation in operation of the engine comprises an increase intake air pressure.

7. The vehicle headway control system according to claim 4, wherein said variation in operation of the engine comprises an increase of fuel injection pulse width.

8. The vehicle headway control system according to claim 4, wherein said variation in operation of the engine comprises an increase in oil pressure.

9. The vehicle headway control system according to claim 4, wherein said variation in operation of the engine comprises an increase in the frequency of ignition pulses.

10. A vehicle headway control system, comprising:
a following control unit that performs a following control which causes a host vehicle to follow a preceding vehicle in congested traffic, wherein the following control unit autonomously starts the following control on condition that it detects that the host vehicle remains stationary, the preceding vehicle has started moving, and a shift lever of a transmission is in a drive range.

11. The vehicle headway control system according to claim 10, wherein the following control unit refrains from starting the following control if a driver is operating a brake.

12. The vehicle headway control system according to claim 10, wherein the following control unit starts the following control on condition that it detects that a driver operates to release a brake pedal.

13. A vehicle headway control system, comprising:
a following control unit that performs following control of a host vehicle, causing it to follow a preceding vehicle in congested traffic;
means for measuring a characteristic value that is indicative of a degree of movement of said vehicle in response to an input demand from an operator of said host vehicle;
means for generating a triggering signal indicative of a start of movement of said host vehicle when said characteristic value exceeds a preset value;
means for autonomously initiating following control of said host vehicle by said following control unit in response to receipt of said triggering signal.

14. The vehicle headway control system according to claim 13, wherein said characteristic value comprises a vehicle operating parameter.

15. The vehicle headway control system according to claim 13, wherein said characteristic value is based on a magnitude of a change of at least one vehicle operating parameter selected from the group consisting of vehicle acceleration, vehicle speed, engine speed, intake air, quantity, fuel injection pulse width, engine oil pressure and frequency of ignition pulses.

16. The vehicle headway control system according to claim 15, wherein said triggering signal is generated at a point in time at which a value of said at least one operating parameter exceeds a predetermined value following a stopping of said host vehicle.

17. The vehicle headway control system according to claim 13, wherein said characteristic value is indicative of a variation in engine operation when the operator starts the vehicle in motion in heavy traffic.

18. A vehicle headway control system, comprising:
a following control unit that performs a following control which causes a host vehicle to follow a preceding vehicle in congested traffic; and
means, operative after the host vehicle has come to a standstill, for generating a vehicle following control starting signal when a characteristic value generated in the host vehicle reaches a magnitude indicative that the host vehicle has started moving in response to an input demand for a resumption of movement from a driver;
wherein said following control unit autonomously commences following control operation upon receipt of said vehicle starting signal.

19. The headway control system according to claim 18, wherein the characteristic value is based on at least one vehicle operating parameter selected from the group consisting of vehicle speed, vehicle acceleration, engine speed, intake air pressure, fuel injection pulse width, engine oil pressure; and frequency of ignition pulses.

* * * * *